United States Patent

Kim

[11] Patent Number: 5,946,201
[45] Date of Patent: Aug. 31, 1999

[54] BOOST-UP POWER FACTOR CORRECTING CIRCUIT USING A POWER FEEDBACK

[75] Inventor: Sang Yeal Kim, Kyoungsangnam-Do, Rep. of Korea

[73] Assignee: LG Electronics Inc., Seoul, Rep. of Korea

[21] Appl. No.: 09/098,003

[22] Filed: Jun. 16, 1998

[30] Foreign Application Priority Data

Jul. 11, 1997 [KR] Rep. of Korea ........................ 97-32181

[51] Int. Cl.⁶ .................................................. H02M 3/335
[52] U.S. Cl. ................................................. 363/21; 363/60
[58] Field of Search .................................. 363/20, 21, 37, 363/39, 40, 49, 60, 86; 323/222, 285, 290, 351

[56] References Cited

U.S. PATENT DOCUMENTS

| | | | |
|---|---|---|---|
| 4,214,189 | 7/1980 | Bohringer | 315/408 |
| 4,937,722 | 6/1990 | Deierlein | 363/49 |
| 4,949,233 | 8/1990 | Braunisch et al. | 363/28 |
| 5,513,088 | 4/1996 | Williamson | 363/20 |
| 5,559,395 | 9/1996 | Venkitasubrahmanian et al. | 315/247 |
| 5,751,115 | 5/1998 | Jayaraman et al. | 315/225 |
| 5,877,946 | 3/1999 | Fitzgerald | 363/21 |

FOREIGN PATENT DOCUMENTS 2034940   6/1980   United Kingdom .
2153603   8/1985   United Kingdom .

*Primary Examiner*—Adolf Deneke Berhane
*Attorney, Agent, or Firm*—Jacobson, Price, Holman & Stern, PLLC

[57] ABSTRACT

A boost-up power factor correcting circuit using a power feed back capable of stably supplying the power source to the load by correcting a power factor, so that the power is fed-back in a high-frequency current using an auxiliary winding to be included in an SMPS transformer. The circuit includes a rectifying section for rectifying an inputted AC voltage, an inductor transformer, having a first inductor winding connected to the rectifying section and a second inductor winding, for accumulating a magnetic energy, an SMPS transformer having a primary winding connected to the first inductor winding of the inductor transformer and an auxiliary winding connected to the second inductor winding of the inductor transformer, the auxiliary winding generating a voltage having a phase opposite to that of a voltage applied to the primary winding, a power feedback section connecting in a closed loop the auxiliary winding of the SMPS transformer and the second inductor winding, for feeding-back the magnetic energy accumulated at the auxiliary winding, and a switching control section connected to the primary winding of the SMPS transformer, for controlling the switching operation of the SMPS transformer.

2 Claims, 2 Drawing Sheets

BOOST-UP POWER FACTOR CORRECTING CIRCUIT USING A POWER FEEDBACK

BACKGROUND OF THE INVENTION

1. Field of the Invention

The present invention relates to a boost-up power factor correcting circuit using a power feedback, and more particularly to a boost-up power factor correcting circuit using a power feedback which can correct a power factor by a power feedback in high frequency current using an auxiliary winding to be wound in an SMPS transformer.

2. Description of the Related Art

In general, industrial or household electric appliances use direct current (DC) as their operating power sources. The DC power sources are generally produced by a circuit rectifying commercial alternating current (AC) power sources, such as a capacitor-input type rectifying circuit which has a simple circuit construction. However, the capacitor-input type rectifying circuit has a low power factor because the input current has a pulse type of flowing only over the peak part of the input AC voltage. For this reason, the electric appliances generally employ a power factor correction circuit.

FIG. 1 shows a power supply circuit of an electric appliance employing a conventional power factor correcting circuit. Referring to FIG. 1, the power supply circuit of an electric appliance employing a conventional power factor correcting circuit comprises a rectifying section 70 for full-wave rectifying the inputted AC voltage, a power factor correcting section 71 for correcting a power factor of the power source rectified by the rectifying section 70, an SMPS 72 for switching so as to convert the output voltage of the power factor correcting section 71 into a predetermined constant voltage, a microcomputer 73 for comprehensively controlling an operation of the image displaying appliance including the SMPS 72.

The power factor correcting section 71 includes an inductor L connected to the rectifying section 70 for accumulating a magnetic energy, a diode D connected between the inductor L and the SMPS 72, an FET 74 connected between the inductor L and the anode of the diode D for performing a high-speed switching operation, an FET control IC 75 connected to the gate of the FET 74 for controlling the switching operation of the FET 74. A capacitor C is connected between the cathode of the diode D and the drain of the FET 74.

The operation of the conventional power factor correcting circuit constructed above will now be described with reference to FIG. 1.

If an alternating current (AC) power source is inputted to the rectifying section 70, the rectifying section 70 full-wave rectifies the inputted AC power source and outputs it to the inductor L of the power factor correcting section 71. Then, the rectified power source is inputted to the capacitor C through the inductor L and the diode D. Thus, the capacitor C smooths the rectified power source and outputs it to the SMPS 72. The SMPS 72 voltage-converts the inputted DC power source inputted according to the control signal of the microcomputer 73 into a constant voltage required by each part of the image displaying appliance.

At this time, the FET control IC 75 of the power factor correcting section 71 switches the FET 75 at high speed so as to correct the power factor of the DC power source applied to the SMPS 72.

That is, if the FET control IC 75 applies the switching control signal to the gate of the FET 74, the FET 74 is turned on. Consequently, the inductor L cannot input the rectified voltage inputted from the rectifying section 70 to the diode D. However, if the FET control IC 75 does not apply the switching control signal to the FET 74, the FET 74 is turned off. Then, the inductor L outputs the accumulated magnetic energy to the capacitor C through the diode D. Since the operation described above is performed at high frequency current by the FET 74, the power factor of the charged current is inputted from the capacitor C to the SMPS 72 after being corrected.

However, such a conventional power factor correcting circuit has a disadvantage in that the manufacturing cost of the power factor correcting circuit is notably increased due to an employment of the FET 74 of high cost. Further, the circuit is complicated since a separate driving switching element, such as the FET control IC (75), is used for the FET 74.

SUMMARY OF THE INVENTION

It is an object of the present invention to resolve the problems involved in the related art, and to provide a boost-up power-factor correcting circuit using a power feedback which can stably supply the power source to a load by correcting a power factor so as to feedback the power in a high frequency current with an auxiliary winding wound in an SMPS transformer.

According to one aspect of the present invention, there is provided a boost-up power factor correcting circuit using a power feedback, comprising a rectifying section for rectifying an inputted AC voltage, an inductor transformer, having a first inductor winding connected to the rectifying section and a second inductor winding, for accumulating a magnetic energy, an SMPS transformer having a primary winding connected to the first inductor winding of the inductor transformer and an auxiliary winding connected to the second inductor winding of the inductor transformer, the auxiliary winding generating a voltage having a phase opposite to that of a voltage applied to the primary winding, a power feedback section connecting in a closed loop the auxiliary winding of the SMPS transformer and the second inductor winding, for feedingback the magnetic energy accumulated at the auxiliary winding, and a switching control section connected to the primary winding of the SMPS transformer, for controlling the switching operation of the SMPS transformer.

BRIEF DESCRIPTION OF THE DRAWINGS

The above objects, other features and advantages of the present invention will become more apparent by the preferred embodiment described with reference to the accompanying drawings, in which.

DETAILED DESCRIPTION OF THE PREFERRED EMBODIMENT

Figure 1:
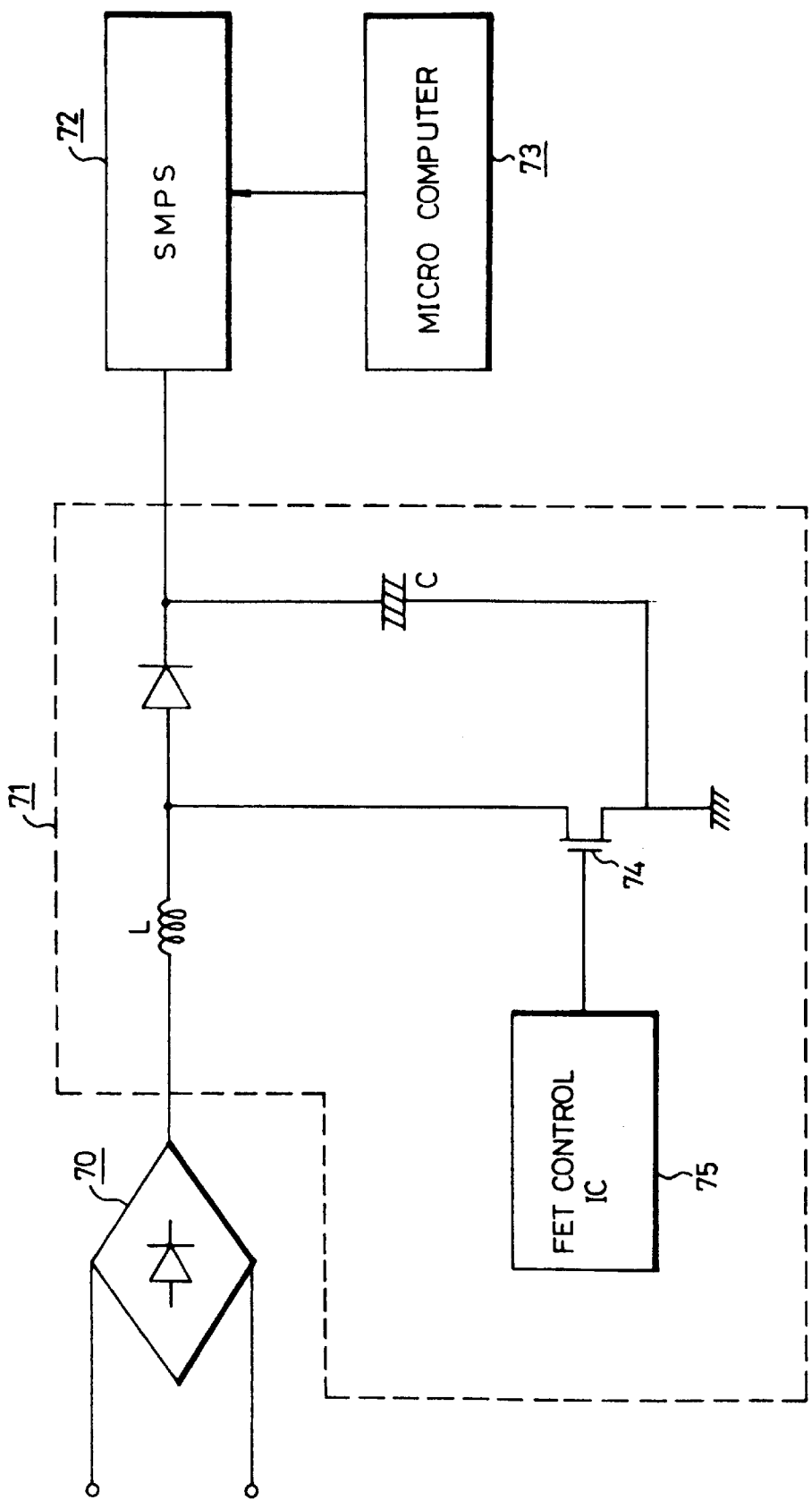
FIG. 1 is a block diagram illustrating the conventional power factor correcting circuit applicable to an electronic appliance.
Figure 2:
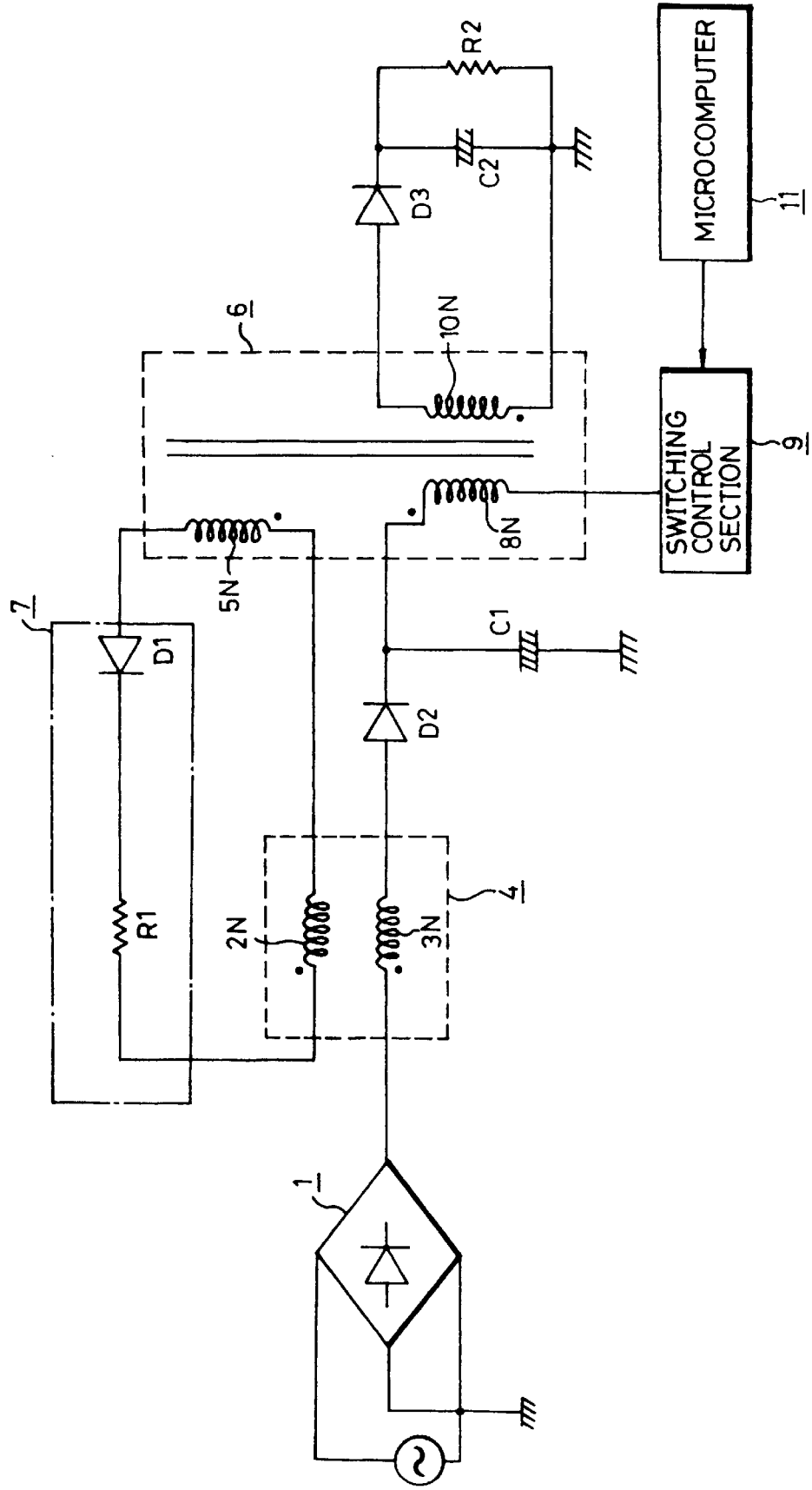
FIG. 2 is a block diagram illustrating a power factor correcting circuit according to the present invention.

FIG. 2 is a block diagram illustrating a power factor correcting circuit according to the present invention.

Referring to FIG. 2, the power factor correcting circuit comprises a rectifying section 1 for full-wave rectifying the inputted AC voltage; an inductor transformer 4 having a first inductor winding 2N connected to the rectifying section 1 and a second inductor winding 3N for accumulating a magnetic energy; an SMPS transformer 6, which is connected to a primary winding 8N, a secondary winding 10N and the first inductor winding 2N of the inductor transformer 4 and has an auxiliary winding 5N for generating the voltage having a phase opposite to that of the applied voltage of the primary winding 8N; a capacitor C1 connected between the inductor transformer 4 and the SMPS transformer 6 through the diode D2 for smoothing the DC power source inputted from the diode D2; a power feedback section 7 connecting the auxiliary winding 5N of the SMPS transformer 6 to the first inductor winding 2N in a closed loop through the diode D1 and the resistor R1 for feeding back the magnetic energy accumulated at the auxiliary winding 5N; and a switching control section 9 connected to the primary winding 8N of the SMPS transformer 6 for controlling the switching operation of the SMPS transformer 6.

The diode D3 is connected at the secondary winding 10N of the SMPS transformer 6. The capacitor C2 and the load resistor R2 are connected in parallel and are connected to the cathode of the diode D3. The microcomputer 11 for outputting the switching control signal is connected to the switching control section 9.

The circuit according to an embodiment of the present invention constructed above will now be explained with reference to FIG. 2.

If the alternating current(AC) power source is inputted to the rectifying section 70, the rectifying section 70 full-wave rectifies the inputted AC power source and outputs it to the second inductor winding 3N of the inductor transformer 4. Thereafter, the inputted power source of the second inductor winding 3N is charged in the capacitor C1 through the diode D2.

At this time, if the switching control section 9 turns on the SMPS transformer 6 in accordance with the switching control signal of the microcomputer 11, the capacitor C1 smooths the inputted voltage of the second inductor winding 3N and outputs it to the primary winding 8N of the SMPS transformer 6. Then, the voltage having a phase opposite to that of the applied voltage of the primary winding, is induced to the secondary winding 10N and the auxiliary winding 5N because the secondary winding 10N and the auxiliary winding 5N are wound in an opposite direction to the primary winding 8N. Accordingly, the diodes D1, D3 are turned off since the reverse bias current inputted from the secondary winding 10N and the auxiliary winding 5N is applied to the anode of the diodes D1, D3. As a result, no current flows through the secondary winding 10N and the auxiliary winding 5N. Therefore, the operating voltage is not supplied to the load resistor R2, and the magnetic energy is accumulated in the primary winding 8N by the magnetizing inductance.

In the operating process described above, however, if the switching control section 9 turns off the SMPS transformer 6 in accordance with the switching control signal of the microcomputer 11, the voltage having a phase opposite to that of the applied voltage of the primary winding is induced to the secondary winding 10N and the auxiliary winding 5N. Thus, the forward bias current inputted from the secondary winding 10N and the auxiliary winding 5N is applied to the anode of the diodes D1, D3, and the magnetic energy accumulated in the primary winding 8N of the SMPS transformer 6 is induced to the secondary winding 10N and the auxiliary winding 5N. The magnetic energy induced to the auxiliary winding 5N is fed back into the first inductor winding 2N of the inductor transformer 4 through the diode D1 and the resistor R1. The output voltage VD1 of the diode D1 is expressed by the following equation 1.

$$VD1 = \frac{5N}{8N} \times \frac{D}{1-D} \times VC1 \quad \text{equation 1}$$

Here, D represents a duty, and VC1 represents the charged voltage of the capacitor C1.

The magnetic energy of the first inductor winding 2N is fed back as the power is induced to the second inductor winding 3N again. Thereafter, the current induced to the second inductor winding 3N is inputted to the capacitor C1 through the diode D2, and the capacitor C1 is boosted up by the current of the second inductor winding 3N. Then, the magnetic energy induced from the secondary winding 10N of the SMPS transformer 6 is outputted as the constant voltage required by each part of image displaying appliance through the diode D3.

That is, the magnetic energy accumulated in the primary winding 8N of the SMPS transformer 6 is induced to the first inductor winding 2N through the diode D1, and the magnetic energy of the first inductor winding 2N is induced to the second inductor winding 3N. Accordingly, the magnetic energy accumulated in the second inductor winding 3N boosts up the capacitor C1 through the diode D2. Therefore, when the operation described above is performed according to the high-frequency of the switching control section 9, the output of the capacitor C1 becomes closer to the fundamental wave, and the power factor of the capacitor C1 is notably corrected.

The present invention as described above enables supplying a stable power source to the load by correcting the power factor which is followed by feeding back the power with high frequency current using an auxiliary winding included in an SMPS transformer, thereby notably improving the quality of products.

While the present invention has been described and illustrated herein with reference to the preferred embodiments thereof, it will be understood by those skilled in the art that various changes in form and details may be made therein without departing from the spirit and scope of the invention.

What is claimed is:

1. A boost-up power factor correcting circuit which includes a rectifying section for rectifying an inputted AC voltage, comprising:

an inductor transformer, having a first inductor winding connected to the rectifying section and a second inductor winding, for accumulating a magnetic energy;

an SMPS transformer having a primary winding connected to the first inductor winding of the inductor transformer and an auxiliary winding connected to the second inductor winding of the inductor transformer, the auxiliary winding generating a voltage having a phase opposite to that of a voltage applied to the primary winding;

a power feedback section connecting in a closed loop the auxiliary winding of the SMPS transformer and the second inductor winding, for feedingback the magnetic energy accumulated at the auxiliary winding; and a switching control section connected to the primary winding of the SMPS transformer, for controlling the switching operation of the SMPS transformer.

2. A boost-up power factor correcting circuit as claimed in claim 1, wherein the closed loop between the auxiliary winding of the SMPS transformer and the first inductor winding includes a diode and a resistor connected in series.

* * * * *